United States Patent
Goenka et al.

(10) Patent No.: US 9,521,172 B1
(45) Date of Patent: Dec. 13, 2016

(54) METHOD AND SYSTEM FOR SHARING ONLINE CONTENT

(71) Applicant: Google Inc., Mountain View, CA (US)

(72) Inventors: Vishal Goenka, Santa Clara, CA (US); Stephen Ngok Tsun, Cupertino, CA (US); Dave Monsees, San Francisco, CA (US)

(73) Assignee: Google Inc., Mountain View, CA (US)

( * ) Notice: Subject to any disclaimer, the term of this patent is extended or adjusted under 35 U.S.C. 154(b) by 217 days.

(21) Appl. No.: 14/144,992

(22) Filed: Dec. 31, 2013

Related U.S. Application Data

(60) Provisional application No. 61/798,595, filed on Mar. 15, 2013.

(51) Int. Cl.
 *G06F 17/00* (2006.01)
 *H04L 29/06* (2006.01)
 *G06F 17/22* (2006.01)

(52) U.S. Cl.
 CPC ......... *H04L 65/403* (2013.01); *G06F 17/2235* (2013.01)

(58) Field of Classification Search
 CPC .................... H04L 65/403; G06F 17/2235
 See application file for complete search history.

(56) References Cited

U.S. PATENT DOCUMENTS

| | | | |
|---|---|---|---|
| 7,707,203 B2 | 4/2010 | Hyder et al. | |
| 8,060,830 B2 | 11/2011 | Kahn et al. | |
| 8,200,775 B2 | 6/2012 | Moore | |
| 2010/0005001 A1 | 1/2010 | Aizen et al. | |
| 2010/0005008 A1* | 1/2010 | Duncker | G06F 17/30893 705/26.1 |
| 2012/0004976 A1 | 1/2012 | Guo et al. | |
| 2012/0102402 A1* | 4/2012 | Kwong | G06F 3/038 715/705 |
| 2012/0102420 A1* | 4/2012 | Fukahori | G06Q 10/107 715/771 |
| 2012/0197980 A1 | 8/2012 | Terleski et al. | |
| 2013/0031487 A1* | 1/2013 | Olsen | G06Q 10/10 715/751 |

(Continued)

OTHER PUBLICATIONS

FriendFeed, "FriendFeed is the easiest way to share online"; http://friendfeed.com, retrieved Jan. 27, 2010.*

*Primary Examiner* — Stephen Hong
*Assistant Examiner* — Marshon Robinson
(74) *Attorney, Agent, or Firm* — Foley & Lardner LLP; John D. Lanza

(57) ABSTRACT

A system and a computer-implemented method for sharing online content are provided. The method is implemented using a computer device coupled to a user interface and a memory device. The method includes receiving, from a sharer, a selection of at least one feed of online content to be shared and at least one sharee of the feed of online content, the feed of online content including a plurality of items, each item including a reference identifier linking each item to respective historical interaction data, pairing the sharer with at least one sharee of the feed of online content by securely linking an account of the sharer to an account of the sharee, sharing the selected at least one feed of online content from the sharer to the sharee, and displaying a link to the shared feed as a normal feed object under the sharee's account.

18 Claims, 6 Drawing Sheets

(56) References Cited

U.S. PATENT DOCUMENTS

| | | | |
|---|---|---|---|
| 2013/0254849 A1* | 9/2013 | Alison | G06F 21/51 726/4 |
| 2014/0013246 A1* | 1/2014 | Beechuk | H04L 65/403 715/753 |
| 2014/0282101 A1* | 9/2014 | Beechuk | H04W 4/003 715/753 |

* cited by examiner

METHOD AND SYSTEM FOR SHARING ONLINE CONTENT

CROSS REFERENCE TO RELATED APPLICATIONS

This application claims priority to and the benefit of the filing date of U.S. Provisional Application No. 61/798,595 filed on Mar. 15, 2013, which is hereby incorporated by reference in its entirety.

BACKGROUND

This description relates to online content, and, more particularly, to a network-based method and system for sharing online content to ensure proper publication of the online content.

An online content management system may provide for the creation of templates for items of online content, such that certain components of an item of online content are configurable, so that they may incorporate different components or characteristics, in response to characteristics of the online users viewing the item of online content. Such components may be referred to as dynamic content. For example, an item of online content may be configured to be displayed in whatever language is the primary language of the country or region of the online viewer. Other components, such as the identification of specific products, local currency, time and the like, may be configurable based on the location or other characteristics of the online viewer.

An agency may be contracted with to provide creatives, which when complete may be shared with the online content provider that hired the agency. In some cases, if a mistake is made, the creative may be shared with a wrong entity, for example, a competitor of the online content provider.

BRIEF DESCRIPTION

In one embodiment, a computer-implemented method for sharing online content is implemented using a computer device coupled to a user interface and a memory device. The method includes receiving, from a sharer, a selection of at least one feed of online content to be shared and at least one sharee of the feed of online content, the feed of online content including a plurality of items, each item including a reference identifier linking each item to respective historical interaction data, pairing the sharer with at least one sharee of the feed of online content by securely linking a representation of the sharer in an account of the sharee to a representation of the sharer in an account of the sharer and linking a representation of the sharee in an account of the sharer to a representation of the sharee in an account of the sharee, sharing the selected at least one feed of online content from the sharer to the sharee, and displaying a link to the shared feed as a normal feed object under the sharee's account.

In another embodiment, a computer system includes a processor; and a computer-readable storage device having encoded thereon computer readable instructions that are executable by the processor to perform functions including receiving, from a sharer, a selection of at least one feed of online content to be shared and at least one sharee of the feed of online content, pairing the sharer with at least one sharee of the feed of online content by securely linking an account of the sharer to an account of the sharee, sharing the selected at least one feed of online content from the sharer to the sharee, and displaying a link to the shared feed as a normal feed object under the sharee's account.

In yet another embodiment, computer-readable storage media having computer-executable instructions embodied thereon are provided. When executed by at least one processor, the computer-executable instructions cause the processor to receive, from a sharer, a selection of at least one online content dynamic creatives associated with a single webpage to be shared and at least one sharee of the feed of online content, pair the sharer with at least one sharee of the feed of online content by securely linking an account of the sharer to an account of the sharee, share the selected at least one feed of online content from the sharer to the sharee, and display a link that includes an ID of the real feed and a share mode to the shared feed as a normal feed object under the sharee's account.

In another embodiment, a computer system for sharing online content is provided. The system includes a computer device coupled to a user interface and a memory device. The system further includes means for receiving, from a sharer, a selection of at least one feed of online content to be shared and at least one sharee of the feed of online content, the feed of online content including a plurality of items, each item including a reference identifier linking each item to respective historical interaction data. Additionally, the system also includes means for pairing the sharer with at least one sharee of the feed of online content by securely linking a representation of the sharer in an account of the sharee to a representation of the sharer in an account of the sharer and linking a representation of the sharee in an account of the sharer to a representation of the sharee in an account of the sharee. The system also includes means for sharing the selected at least one feed of online content from the sharer to the sharee, and means for displaying a link to the shared feed as a normal feed object under the sharee's account.

In another aspect, the computer system further includes means for initiating sharing of an account associated with the sharer in a feed sharing tool with the sharee associated with the sharer in a different account in the tool. The computer system also includes means for linking the reference identifier for each item to respective historical interaction data, which includes at least one of click-throughs associated with each item, an identification of other associated items, views of each item by users, conversions associated with each item, and categories of demographics associated with each item. The computer system also includes means for receiving, from a sharer a selection of at least one dynamic creative to be shared and at least one sharee of the dynamic creative. The computer system also includes means for receiving, from a sharer a selection of a plurality of dynamic creatives associated with a single webpage. The computer system also includes means for transmitting a secure ID from the sharer to the sharee. The computer system also includes means for transmitting a hash ID from the sharer to the sharee. The computer system also includes means for including the secure ID in an electronic communication between the sharer and the sharee. The computer system also includes means for generating a link between the sharer and sharee accounts in the tool using a datastore using the secure ID. The computer system also includes means for sharing the selected at least one feed of online content unilaterally from the sharer to the sharee. The computer system also includes means for sharing a plurality of selected at least one feed of online content unilaterally from the sharer to the sharee. The computer system also includes means for displaying a link that includes an ID of the real feed and a share mode to the shared feed as a normal feed object under the sharee's account. The computer system also includes means for creating a shared entity in the sharee's account that does not follow normal group authorization. The computer system also includes means for sharing additional feeds.

BRIEF DESCRIPTION OF THE DRAWINGS

FIG. 1 is a block diagram depicting an example online content environment.

FIG. 2 is a diagram of an example online content serving system shown in FIG. 1, in which an aspect of the methods and systems described herein may be employed in accordance with one embodiment of the present disclosure.

FIG. 3 is a data flow diagram for a feed schema for enabling sharing of online content in accordance with an exemplary embodiment of the present disclosure.

FIG. 4 is a flow diagram of a method of sharing online content in accordance with an exemplary embodiment of the present disclosure.

FIG. 5 is a diagram of example computing systems that may be used in the environment shown in FIG. 1 in accordance with one embodiment of the present disclosure.

FIG. 6 is a diagram of components of one or more example computing devices, for example, the computing device shown in FIG. 5 that may be used in the environment shown in FIG. 1.

Figure 1:
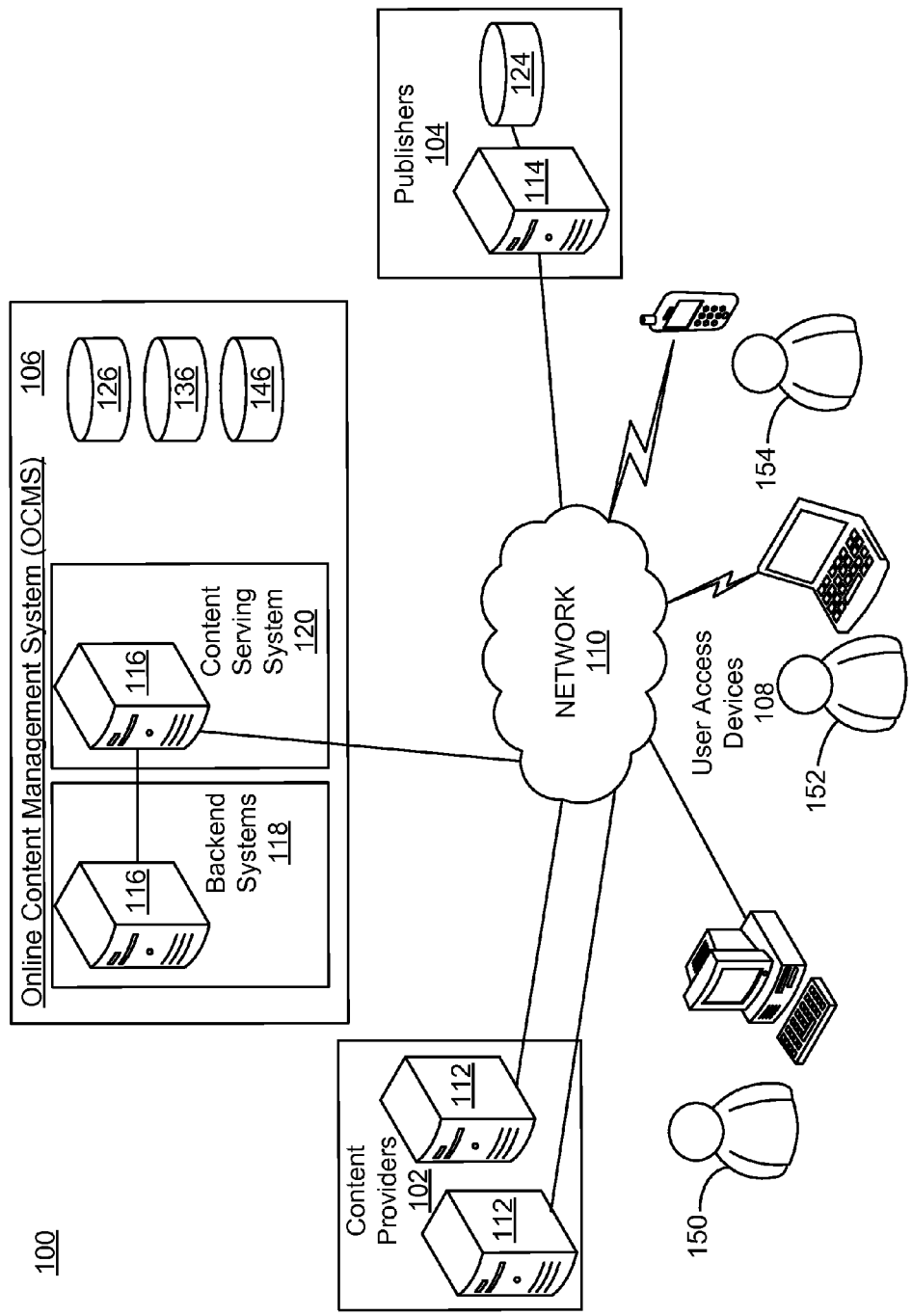
FIGS. 1-6 show exemplary embodiments of the method and system described herein.

Although specific features of various embodiments may be shown in some drawings and not in others, this is for convenience only. Any feature of any drawing may be referenced and/or claimed in combination with any feature of any other drawing.

DETAILED DESCRIPTION

The following detailed description of implementations consistent with the principles of the disclosure refers to the accompanying drawings. The same reference numbers in different drawings may identify the same or similar items. Also, the following detailed description does not limit the embodiments of the disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The subject matter described herein relates generally to online content and/or online advertising. Specifically, the methods and systems herein enable an online content provider or agency to share, in a secure manner, creatives and enable the agency or online content provider to preview, approve and test online content items as those online content items would appear to an online user, taking into account the viewing circumstances of the online user, such as the location of the user device, possible demographic data associated with the user, etc. The methods and systems herein specifically address the ability of an online content provider or other third party to share and review created dynamic online content items. Moreover, a privacy of users is of concern, when allowing online content providers 102 to direct communications to very small geographical regions, for example, regions of less than one kilometer squared, and regions having a very small population. To comply with privacy concerns and regulations, the user data may be maintained in an anonymous manner and may not include personally identifiable information as described herein.

Dynamic online content (also referred to herein as "creatives") are online content items that are dynamically generated according to an online content item template using one or more components. For example, an online content item template can be a creative that specifies one or more component slots each requiring a component of a desired component type, such as a background image, a headline, a promotional slogan, a product image, a price quote, a landing page URL, a call-to-action (e.g., a message promoting a viewer action such as "Register Now!"), and so on. A component can be associated with a single component type based on the component's structural or format characteristics or the component's function in the online content item template. In some implementations, a component may also be associated with various attribute values (e.g., color, font, model number, customer rating, etc.). As used in this specification, a component is a data item that has structural and format qualities meeting the specifications of a component type. Components of the same component type are interchangeable in a corresponding component slot of a content item template when constructing a content item. Content items generated using different components for the same component slots are identical except for the portions of each content item that are affected by the content and/or attributes of the different components.

Multiple (e.g., from a few, tens of thousands, to potentially tens of millions) components of each component type can be made available for selection and application to a component slot in the online content item template. Components of the same component type can have varying content (e.g., text, image theme, price value, etc.), and descriptive labels of the varying content can be associated with each component. The descriptive labels allow a suitable component to be selected for a component slot based not only on component type but also on content. In some implementations, attribute values can also be used as criteria for selecting a component.

Components available for constructing a dynamic online content item can be provided by one or more data feeds. An online content management system can select from the data feeds suitable components for the component slots in an online content item template in response to a received online content item request. The dynamic online content item can be created when the selected components are applied to the component slots according to the specifications of the online content item template. The created dynamic online content item can then be delivered to a requesting user device for presentation.

The online content provider can modify or update the components available in the data feed or data store frequently and have the changes timely reflected in the dynamic online content generated and delivered in response to each online content item request.

In addition to varying the quantity and content of the components available for selection in the data feeds, an online content provider can also design various business rules by which the components can be selected for a dynamic online content item in response to a received online content item request. Some of the business rules can be independently applied. For example, one business rule can specify that a "headline" component slot in an online content item template can only be filled by a headline component that contains words matching a keyword specified in the online content item request. Another business rule can specify that a product image slot in the online content item template can only be filled by a product image having a warm color scheme for online content item requests received during the winter months and a cool color scheme for online content item requests received during the summer months. In the above example, the first business rule and the second business rule are independently applied, and the selection of components based on the first business rule does not have any influence on the selection of components based on the second business rule, absent any inter-slot constraints.

Multiple business rules can be specified by the online content provider for the construction of a dynamic online content item. The business rules can be slot dependent, time dependent, demographic dependent, geographic dependent, and so on. Some business rules can also be conditionally applied. For example, a conditional business rule can specify that components showing promotional prices are only used in a dynamic online content item if the click-through rates of past online content did not reach a predetermined threshold value.

The methods and systems described herein may be implemented using computer programming or engineering techniques including computer software, firmware, hardware or any combination or subset thereof, wherein the technical effect may be achieved by performing at least one of the following steps: a) receiving, from a sharer, a selection of at least one feed of online content to be shared and at least one sharee of the feed of online content, the feed of online content including a plurality of items, each item including a reference identifier linking each item to respective historical interaction data, b) pairing the sharer with at least one sharee of the feed of online content by securely linking a representation of the sharer in an account of the sharee to a representation of the sharer in an account of the sharer and linking a representation of the sharee in an account of the sharer to a representation of the sharee in an account of the sharee, c) sharing the selected at least one feed of online content from the sharer to the sharee, d) displaying a link to the shared feed as a normal feed object under the sharee's account, e) initiating the sharing of an online content provider associated with the sharer in one account in the tool, with the sharee also associated with the online content provider in a different account in the tool, f) presenting, in a user interface, a representation of at least one feed of online content, g) transmitting a secure ID from the sharer to the sharee, h) including the transmitted secure ID in an electronic communication between the sharer and the sharee, i) generating a link between the sharer and sharee accounts in the tool using a datastore, j) sharing the selected at least one feed of online content unilaterally from the sharer to the sharee, and k) sharing a plurality of selected at least one feed of online content unilaterally from the sharer to the sharee.

The following description refers to the accompanying drawings, in which, in the absence of a contrary representation, the same numbers in different drawings represent similar elements.

FIG. 1 is a diagram depicting an example networked environment 100. With reference to FIG. 1, an example networked environment 100 may include one or more content providers 102, one or more publishers 104, an online content management system (OCMS) 106, and one or more user access devices 108, which may be coupled to a network 110. User access devices 108 are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network.

The content providers 102 may include any entities that are associated with content. In some embodiments, the content includes any form of communication in which one or more products, services, ideas, messages, people, organizations or other items are identified and promoted (or otherwise communicated). Content is not limited to advertisements and commercial promotions. Rather, content may additionally or alternatively include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device. A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or track content, which may be related to products or services offered by or otherwise associated with the content providers 102. The content providers 102 may include or maintain one or more content provider data processing system 112, such as servers or embedded systems, coupled to the network 110. The content providers 102 may include or maintain one or more processes that run on one or more data processing systems.

Publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, publishers 104 may include publishers 104 with an Internet presence, such as online publication and news providers (e.g., online newspapers, online magazines, television websites, etc.), online service providers (e.g., financial service providers, health service providers, etc.), and the like. Publishers 104 can include software application providers, television broadcasters, radio broadcasters, satellite broadcasters, and other providers of publications. One or more of publishers 104 may represent a publication network that is associated with the OCMS 106.

Publishers 104 may receive requests from the user access devices 108 (or other elements in the environment 100) and provide or present publications to the requesting devices. Publishers 104 may provide or present publications via various mediums and in various forms, including web based and non-web based mediums and forms. Publishers 104 may generate and/or maintain such publications and/or retrieve the publications from other network resources.

In addition to publications, publishers 104 may be configured to integrate or combine retrieved publications with content that is related or relevant to the retrieved publication for display to users 150, 152, and 154. As discussed further below, the relevant content may be provided from OCMS 106 and may be combined with a publication for display to users 150, 152, and 154. In some examples, publishers 104 may retrieve a publication for display on a particular user access device 108 and then forward the publication to the user access device 108 along with code that causes content from OCMS 106 to be displayed to the user 150, 152, or 154. In other examples, publishers 104 may retrieve a publication, retrieve relevant content (e.g., from the OCMS 106 or the content providers 102), and then integrate the content and the publication to form a page for display to the user 150, 152, or 154.

As noted above, one or more of publishers 104 may represent a publication network. In such an implementation, the content providers 102 may be able to present content items to users through this publication network.

Publishers 104 may include or maintain one or more publisher data processing systems 114, such as servers or embedded systems, coupled to the network 110. They may include or maintain one or more processes that run on data processing systems. In some examples, publishers 104 may include one or more content repositories 124 for storing publications and other information.

The OCMS 106 manages content and provides various services to content providers 102, publishers 104, and user access devices 108. OCMS 106 may store content in an online content repository or database 126 and facilitate the distribution or selective provision and recommendation of content through environment 100 to user access devices 108. In some configurations, OCMS 106 may include or access functionality associated with the AdWords™, AdSense™ and/or AdMob™ systems provided by Google Inc. (Mountain View, Calif.).

OCMS 106 may include one or more OCMS data processing systems 116, such as servers or embedded systems, coupled to network 110. It can also include one or more processes, such as server processes. In some examples, OCMS 106 may include a content serving system 120 and one or more backend processing systems 118. Content serving system 120 may include one or more OCMS data processing systems 116 and may perform functionality associated with delivering content to publishers 104 or user access devices 108. Backend processing systems 118 may include one or more OCMS data processing systems 116 and may perform functionality associated with identifying relevant content to deliver, processing various rules, performing filtering processes, generating reports, maintaining accounts and usage information, and other backend system processing. OCMS 106 can use backend processing systems 118 and content serving system 120 to selectively recommend and provide relevant content from content providers 102 through publishers 104 to user access devices 108.

OCMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

OCMS 106 may include one or more interface or frontend modules (not shown) for providing the various features to content providers 102, publishers 104, and user access devices 108. For example, OCMS 106 may provide one or more publisher front-end interfaces (PFEs) for allowing publishers 104 to interact with OCMS 106. OCMS 106 may also provide one or more content provider front-end interfaces (CPFEs) for allowing content providers 102 to interact with OCMS 106. In some examples, the front-end interfaces may be configured as web applications that provide users with network access to features available in OCMS 106.

OCMS 106 provides various content management features to content providers 102. In some examples, OCMS 106 may include features for content providers 102 similar to those in the AdWords™ system provided by Google Inc. OCMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers 104, analyze financial information, analyze content performance, estimate content traffic, access keyword tools, add graphics and animations to content, etc.

OCMS 106 may allow content providers 102 to create content and input keywords for which the content will appear. In some examples, OCMS 106 may provide content to user access devices 108 or publishers 104 when keywords associated with that content are included in a user request or a requested publication. OCMS 106 may also allow content providers 102 to set bids for content. A bid may represent the maximum amount a content provider 102 is willing to pay for each content impression, user click-through of content or other interaction with content. A click-through can include any action a user takes to select content. Content providers 102 may also choose a currency and monthly budget.

OCMS 106 may also allow content providers 102 to view information about content impressions, which may be maintained by OCMS 106. OCMS 106 may be configured to determine and maintain the number of content impressions relative to a particular website or keyword. OCMS 106 may also determine and maintain the number of click-throughs for content as well as the ratio of click-throughs to impressions.

OCMS 106 may also allow content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). OCMS 106 may store conversion data and other information in a online content item database 136.

OCMS 106 may allow content providers 102 to input description information associated with content. This information could be used to assist publishers 104 in determining content to publish. Content providers 102 may additionally input a cost/value associated with selected conversion types, such as a five dollar credit to publishers 104 for each product or service purchased.

OCMS 106 may provide various features to publishers 104. In some examples, OCMS 106 may include features for publishers 104 similar to those in the AdSense™ system provided by Google Inc. OCMS 106 may deliver content (associated with content providers 102) to user access devices 108 when users access publications from publishers 104. OCMS 106 can be configured to deliver content that is relevant to publisher sites, publications, and publisher audiences.

In some examples, OCMS 106 may crawl publications provided by publishers 104 and deliver content that is relevant to publisher sites, publications and publisher audiences based on the crawled publications. OCMS 106 may also selectively recommend and/or provide content based on user information and behavior, such as particular search queries performed on a search engine website, or a designation of content for subsequent review, as described herein, etc. OCMS 106 may store such information in a general database 146. In some examples, OCMS 106 can add search services (e.g., a Google™ search box) to a publisher site and deliver content configured to provide appropriate and relevant content relative to search results generated by requests from visitors of the publisher site. A combination of these and other approaches can be used to deliver relevant content.

OCMS 106 may allow publishers 104 to search and select specific products and services as well as associated content to be displayed with publications provided by publishers 104. For example, publishers 104 may search through content in online content database 126 and select certain content for display with their publications.

OCMS 106 may be configured to selectively recommend and provide content created by content providers 102 to user access devices 108 directly or through publishers 104. OCMS 106 may selectively recommend and provide content to a particular publisher 104 (as described in further detail herein) or a requesting user access device 108 when a user requests search results or loads a publication from publisher 104.

In some implementations, OCMS 106 may manage and process financial transactions among and between elements in environment 100. For example, OCMS 106 may credit accounts associated with publishers 104 and debit accounts of content providers 102. These and other transactions may be based on conversion data, impressions information and/or click-through rates received and maintained by OCMS 106.

"Computing devices", for example user access devices 108, may include any devices capable of receiving information from network 110. User access devices 108 could include general computing components and/or embedded systems optimized with specific components for performing specific tasks. Examples of user access devices 108 include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. User access devices 108 can also include various other elements, such as processes running on various machines.

Network 110 may include any element or system that facilitates communications among and between various network nodes, such as elements 108, 112, 114 and 116. Network 110 may include one or more telecommunications networks, such as computer networks, telephone or other communications networks, the Internet, etc. Network 110 may include a shared, public, or private data network encompassing a wide area (e.g., WAN) or local area (e.g., LAN). In some implementations, network 110 may facilitate data exchange by way of packet switching using the Internet Protocol (IP). Network 110 may facilitate wired and/or wireless connectivity and communication.

For purposes of explanation only, certain aspects of this disclosure are described with reference to the discrete elements illustrated in FIG. 1. The number, identity and arrangement of elements in environment 100 are not limited to what is shown. For example, environment 100 can include any number of geographically-dispersed content providers 102, publishers 104 and/or user access devices 108, which may be discrete, integrated modules or distributed systems. Similarly, environment 100 is not limited to a single OCMS 106 and may include any number of integrated or distributed OCMSs or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
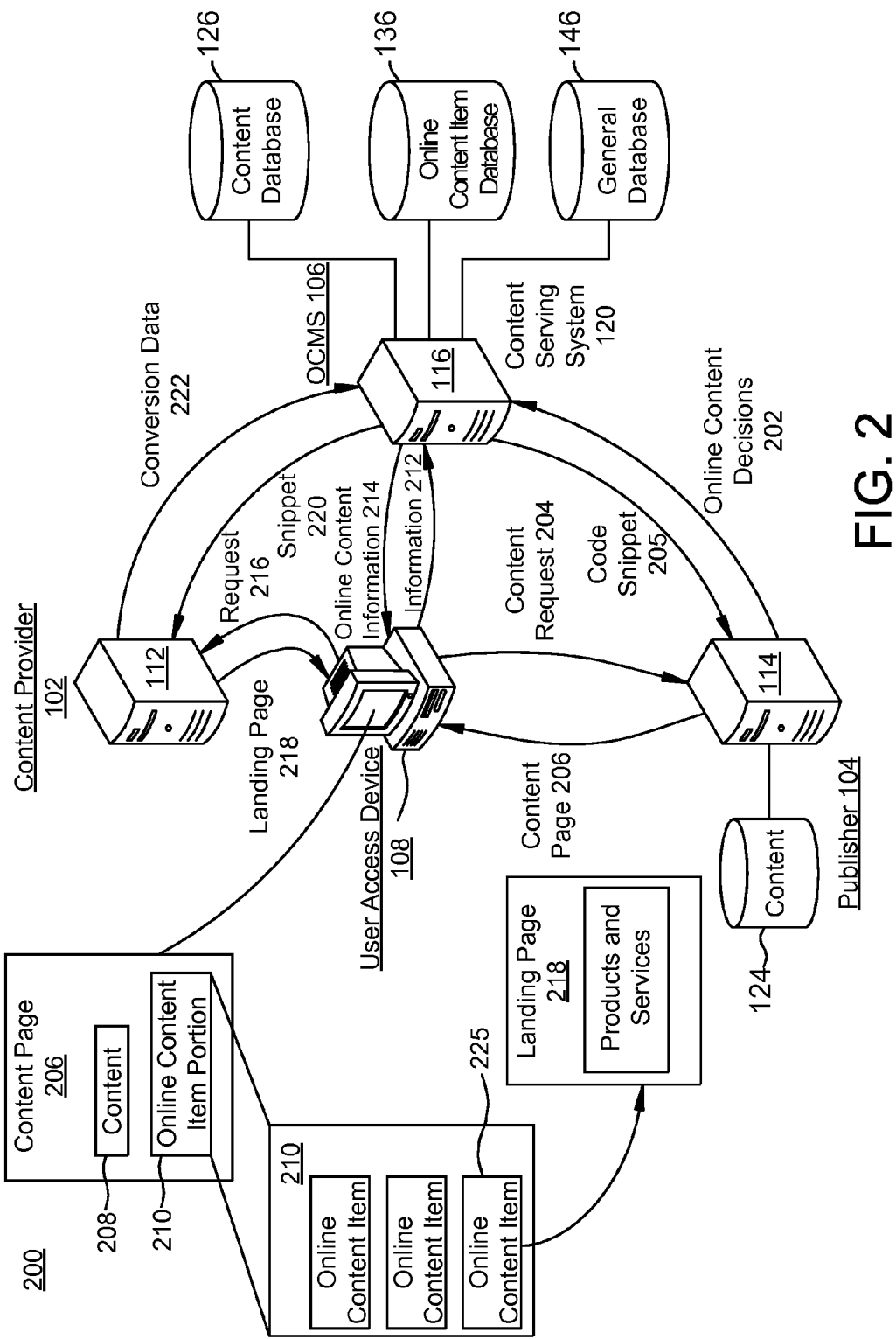

FIG. 2 illustrates an example data flow 200 within environment 100 (shown in FIG. 1). Data flow 200 is an example only and not intended to be restrictive. Other data flows may therefore occur in environment 100 and, even with data flow 200, the illustrated events and their particular order in time may vary. In various embodiments, online content and "ad" are interchangeable.

In data flow 200, OCMS 106 stores online content from content providers 102 and receives online content item decisions 202 from a particular publisher 104. Online content item decisions 202 can include decisions to approve and/or disapprove certain online content and/or online content providers 102. Online content item decisions 202 can be based on aggregated ratings or scores, associated with online content/online content providers 102 that are provided to publisher 104 by OCMS 106. Such aggregated scores can represent ratings of online content/online content providers 102 received from multiple publishers 104.

During data flow 200, publisher 104 may receive a content request 204 from a particular user access device 108. Content request 204 may, for example, include a request for a web document on a given topic (e.g., automobiles). In response to content request 204, publisher 104 may retrieve relevant content (e.g., an automobile article) from content repository 124 or some other source.

Publisher 104 may respond to content request 204 by sending a content page 206 or other presentation to requesting user access device 108. Content page 206 may include requested content 208 (e.g., the automobile article) as well as a code "snippet" 205 associated with online content item 225. A code "snippet" refers, for example, to a method used by one device (e.g., a server) to ask another device (e.g., a browser running on a client device) to perform actions after or while downloading information. In some examples, a code "snippet" may be implemented in JAVASCRIPT® code or may be part of HTML (Hypertext Markup Language) or other web page markup language or content.

OCMS 106 may provide code snippet 205 to publisher 104 and/or user access device 108. Code snippet 205 can originate and/or be provided from other sources. As requesting user access device 108 loads content page 206, code snippet 205 causes user access device 108 to contact OCMS 106 and receive additional code (e.g., JAVASCRIPT® or the like), which causes content page 206 to load with an online content item portion 210.

Online content item portion 210 may include any element that allows information to be embedded within content page 206. In some examples, online content item portion 210 may be implemented as an HTML element, such an I-Frame (inline frame) or other type of frame. Online content item portion 210 may be hosted by OCMS 106 or publisher 104 and may allow online content (e.g., advertisements) from OCMS 106 or publisher 104 to be embedded inside content page 206. Parameters associated with online content item portion 210 (e.g., its size and shape) can be specified in content page 206 (e.g., in HTML), so that user access device 108 can present content page 206 while online content item portion 210 is being loaded. Other implementations of online content item portion 210 may also be used.

Online content item portion 210 may send OCMS 106 formatting and content information 212. Information 212 may include information describing the manner (e.g., how, when, and/or where) in which online content can be rendered by user access devices 108. Information 212 may also include online content item attributes and parameters, such as size, shape, color, font, presentation style (e.g., audio, video, graphical, textual, etc.), etc. Information 212 may also specify a quantity of online content desired.

Formatting and content information 212 can include information associated with requested content 208 displayed in content page 206. Such information may include a URL associated with requested content page 206. Information 212 can include the requested content itself, a category corresponding to the requested content or the content request, part or all of content request 204, content age, content type (e.g., text, graphics, video, audio, mixed media, etc.), geo-location information, and the like.

In response to information 212, OCMS 106 may provide user access device 108 with online content item information 214. Online content item information 214 may include one or more online content items 225 for placement in online content item portion 210 of content page 206. Online content item information 214 may also include a signed or encoded specification of online content item 225.

Online content item information 214 may include online content relevant to user interest. OCMS 106 may retrieve and provide relevant online content based on information 212 received from user access device 108. OCMS 106 may retrieve online content item information 214 from online content item database 136 using backend processing systems 118 (shown in FIG. 1). OCMS 106 may retrieve relevant online content using information from a crawling module, various keywords, various statistical associations between online content items 225 and content, and/or preference information associated with publishers 104.

OCMS 106 may decide whether to serve certain online content item 225 with publisher content based on online content item decisions 202 received from publisher 104. For example, OCMS 106 may identify a relevant online content item 225 from online content item database 136 based on keywords but may decide that online content item 225 should not be served with the publisher content (e.g., the requested automobile document) because publisher 104 has indicated in online content item decisions 202 a disapproval of the identified online content. In some examples, these online content item serving decisions 202 may be based on rules maintained by backend processing systems 118.

Online content item portion 210 may populate with online content items 225 included in online content item information 214, such as online content items 225. Online content item portion 210 and displayed online content items 225 may occupy a portion of content page 206, which may be distinct from other content (e.g., requested content 208) in content page 206.

When a user clicks on one of displayed online content items 225, an embedded code snippet may direct user access device 108 to contact OCMS 106. During this event, user access device 108 may receive an information parcel, such as a signed browser cookie, from OCMS 106. This information parcel can include information, such as an identifier of selected online content item 225, an identifier of publisher 104, and the date/time online content item 225 was selected by the user. The information parcel may facilitate processing of conversion activities or other user transactions.

User access device 108 may then be redirected to online content provider 102 associated with selected online content item 225. User access device 108 may send a request 216 to associated online content provider 102 and then load a landing page 218 from online content provider 102. The user may then perform a conversion action at landing page 218, such as purchasing a product or service, registering, joining a mailing list, etc. A code snippet 220, which may be provided by OCMS 106, may be included within a conversion confirmation page script, such as a script within a web page presented after the purchase. User access device 108 may execute code snippet 220, which may then contact OCMS 106 and report conversion data 222 to OCMS 106. Conversion data 222 may include conversion types and numbers as well as information from cookies. Conversion data 222 may be maintained in online content item database 136.

FIG. 2 is an example only and not intended to be restrictive. Other data flows may therefore occur in environment 100 and, even with data flow 200, the illustrated events and their particular order in time may vary. Further, the illustrated events may overlap and/or may exist in fewer steps. Moreover, certain events may not be present and additional and/or different events may be included.

In alternative data flows, OCMS 106 can allow online content providers 102 to approve publishers 104 in a manner similar to the manner in which publishers 104 approve online content providers 102. In such data flows, OCMS 106 can receive publisher decisions (i.e., decisions about publishers 104) from one or more online content providers 102. The publisher decisions made by online content providers 102 can include approvals and disapprovals of certain publishers 104. These approval/disapproval decisions can be based on aggregated scores, associated with publishers 104 that are provided to online content providers 102. The aggregated scores can represent ratings of publishers 104 received from multiple online content providers 102. When providing relevant online content items 225 to user access devices 108, OCMS 106 may take into account these publisher approvals/disapprovals. For example, OCMS 106 may decide to not provide an otherwise relevant online content item 225 to a given publisher based on the online content provider's disapproval of that publisher. Not providing a relevant online content item 225 to a publisher can include not bidding in an auction for publisher online content item space.

In alternative data flows, publisher 104 can send an online content item request 204 to OCMS 106 prior to sending a content page 206 to user access device 108. OCMS 106 may respond by sending relevant online content items 225 to publisher 104. Publisher 104 may combine the received online content items 225 with requested content 208 in a content page 206 and then send content page 206, including the online content item portion 210, to user access device 108 for display to a user.

In alternative data flows, OCMS 106 may selectively recommend and provide online content items 225 to user access devices 108 based on search terms provided by user access devices 108. In these dataflows, OCMS 106 may provide searching services and receive search terms directly from user access devices 108. OCMS 106 can also receive search terms from a dedicated searching system (not shown) that receives user search requests. OCMS 106 may selectively recommend and provide online content items 225 to user access devices 108 based on the received search terms and online content item keywords provided by the online content providers 102. Other modifications to data flow 200 are also possible.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 3:
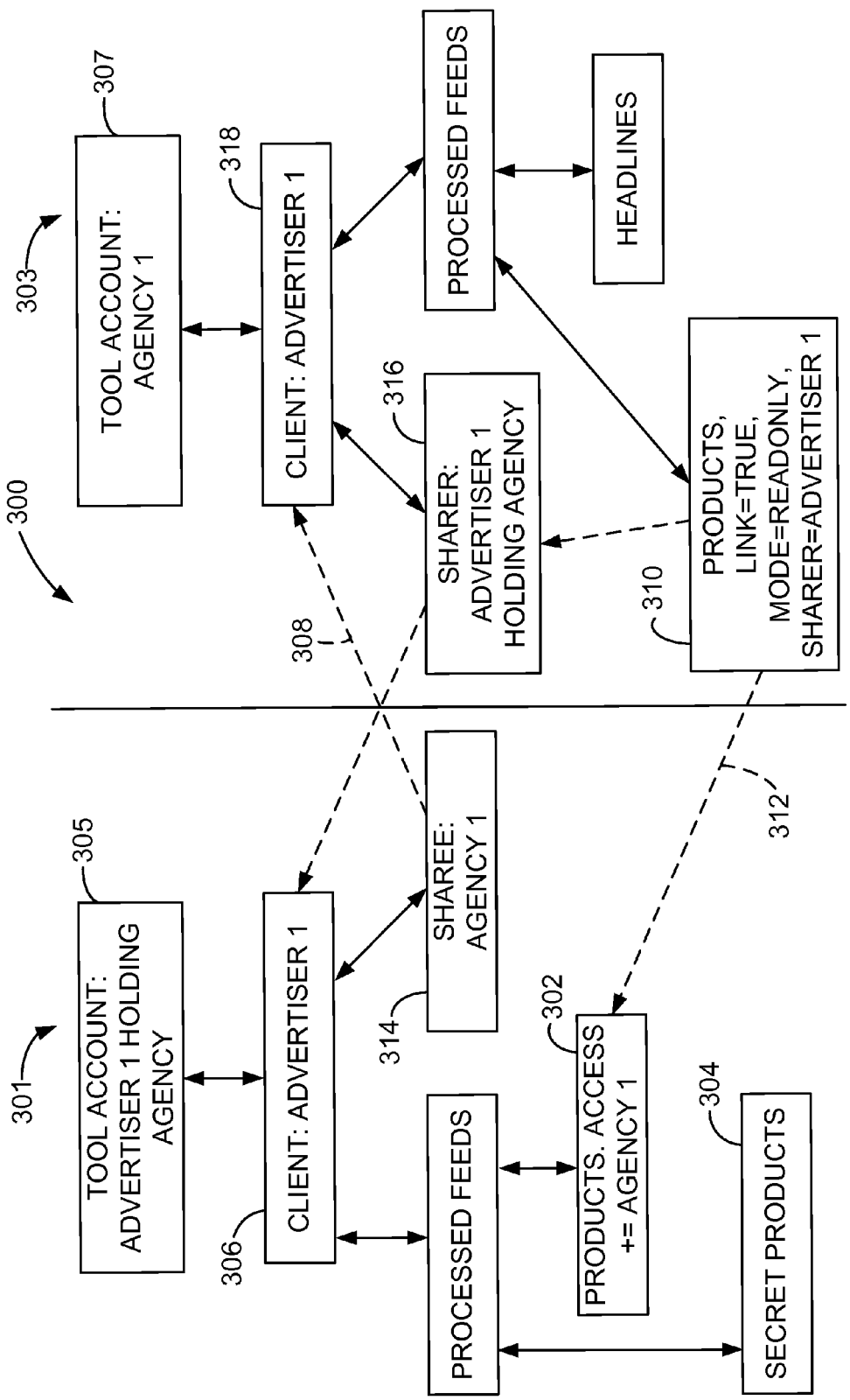

FIG. 3 is a data flow diagram for a feed schema 300 in accordance with an exemplary embodiment of the present disclosure. In the exemplary embodiment, feed schema 300 is associated with a case where an online content provider, (Advertiser1) controls at least some of the feeds and is sharing at least some of the feeds with a creative agency (Agency1). In feed schema 300, the feed owner updates a source of a processed feed, updates any authentication required credentials, and updates frequency.

In various embodiments, Advertiser1 manages its own product feed and shares it with one or more creative agencies, for example, Agency1. Also, because learning is based on the product feed, sharing the feed is better than having the agency create another one.

Several assumptions are made in the implementation of schema 300. A first assumption is that a software tool is used to build in dynamic aspects of a creative, where the user, for example, Advertised sets up a holding account which has only one online content provider, for example, Advertiser1, associated with the tool to manage the Advertiser1 feeds. Advertised is then able to share the feeds owned by Advertiser1 with various agencies. Tabs of the tool not associated with OCMS 106 are invisible to Advertised. Additionally, selective sharing of entire feeds is permitted. For example, Advertised may have n feeds, but only shares a subset of the n feeds with Agency1. A sharing mode is also able to be specified. For example, Advertiser1 is able to specify a read/write mode versus a read only sharing mode and Advertised can initiate a refresh, for example, of the feed from the content source. Advertiser1 is able to share with multiple agencies. For example, when Advertised shares a feed with an agency, all users of that agency (subject to their role) have access to the feed. However, a sharee may not be able to further share a feed with another agency.

Feed schema 300 includes a sharer account view 301 and a sharee account view 303. In the exemplary embodiment, Advertiser1 has two product feeds, a products feed 302 and a secret products feed 304 and it wants to share products feed 302 with Agency1. A first part of the solution is called pairing, where two clients of the agency, or online content providers are paired across two tool accounts. Sharer account view 301 includes a tool account 305 named, Advertiser1 Holding Agency, which is a phantom agency that only holds one of potentially multiple online content providers, Advertiser1. Sharee account view 303 includes a tool account 307 named Agency1. Each of sharer, Advertiser1 and sharee, Agency1 have accounts in the tool.

In the Advertiser1 tool account, an electronic communication, such as, an email is generated and transmitted to Agency1 including a hash ID for Advertised in the sharing holding account. The hash ID uniquely identifies Client: Advertised 306 in the tool. In the tool user interface (UI) for Agency1, the user selects the same online content provider 318, for example, Advertiser1 and enters the incoming hash ID for Advertiser1 306 into a text field in the UI of the tool by copying the hash (a long hex string) from the email and pasting it into the text field. At a client level, the user enters the hash ID to link with the client Advetiser1.

Advertiser1's account is contacted using Agency1's account, either directly or using a service. If the security requirements are met, an Advertiser1 row is created on the Tool Account: Agency1 side of the UI to represent the Sharer: Advertised Holding Agency 316, and likewise on the Tool Account: Advertiser1 Holding Agency 305 side of the UI, a row is created to represent the Sharee: Agency1 314. The creation of the Sharer object under Agency1's account obeys predetermined authorization rules because it is initiated by an authorized user in that account. The creation of the Sharee object, on the other hand, does not necessarily obey the authorization rule because it is initiated from outside the account.

A second part of the solution is sharing. In the exemplary embodiment, after the pairing has been achieved, the Sharer can share items at will (multiple objects) in a unilateral fashion, i.e., no action is required on the part of the sharee, Agency1. In the exemplary embodiment, in the Advertiser1 tool account, a user selects products feed 302, and initiates a share 312 in read-only mode with the sharee, Agency1. In the UI, a list of all the accounts, which with Advertiser1 can share items with is presented. In various embodiments, sharing is done with Tool Account: Advertised Holding Agency 305 instead of Tool Account: Agency1 307. When the sharing of products feed 302 is completed, a link feed 310 is created under Agency1's account 307. Users from this agency will have the ability to read the contents of feed 310, because the access controls that govern feed access is set properly for link feed 310, and are skipped when following link feed 310 to 302.

Shared products feed 302 appears as a normal feed object under the sharee's account "Agency1", "Advertised", but it is only a link. This link contains two important pieces of information. First, it contains the ID of the real feed. Second, it contains a share mode. The creation of a shared entity in the sharee's account does not follow normal group authorization. Once the pairing is done, sharing of any number of feeds can be done by repeating these steps. In the exemplary embodiment, feed schema 300 includes a sharee table under a feed owner, a sharer table under a feed owner, and a symbolic link version of a processed feed.

Figure 4:
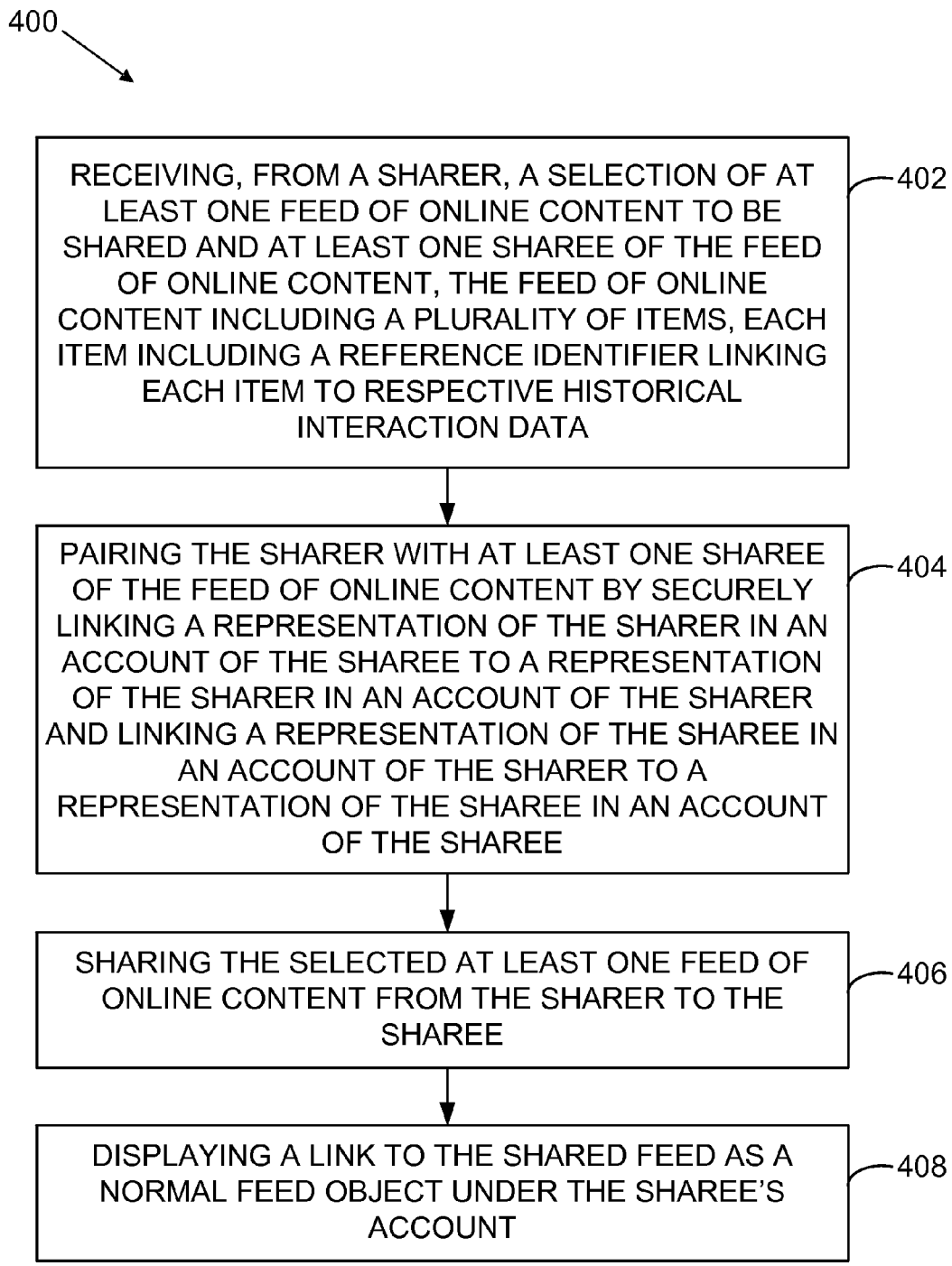

FIG. 4 is a flow diagram of a method 400 of sharing online content items in accordance with an exemplary embodiment of the present disclosure. In the exemplary embodiment, method 400 includes receiving 402, from a sharer, a selection of at least one feed of online content to be shared and at least one sharee of the feed of online content, the feed of online content including a plurality of items, each item including a reference identifier linking each item to respective historical interaction data, pairing 404 the sharer with at least one sharee of the feed of online content by securely linking a representation of the sharer in an account of the sharee to a representation of the sharer in an account of the sharer and linking a representation of the sharee in an account of the sharer to a representation of the sharee in an account of the sharee, sharing 406 the selected at least one feed of online content items from the sharer to the sharee, and displaying a link to the shared feed as a normal feed object under the sharee's account.

Method 400 also optionally includes initiating an account associated with the sharer in a tool wherein the sharee is also associated with an account in the same tool and wherein the sharer and the sharee are both account holders of a sharing tool. Method 400 also includes presenting, in a user interface, a representation of at least one feed of online content items wherein the feed of online content items are components of a dynamic creative or is a plurality of creatives associated with a single webpage. Method 400 further optionally includes transmitting a secure ID from the sharer to the sharee where the secure ID is a hashed ID and wherein the secure ID may be included in an electronic communication between the sharer and the sharee. Moreover, method 400 may also include generating a link between the sharer and sharee accounts in the tool using a datastore, sharing the selected at least one feed of online content items unilaterally from the sharer to the sharee, sharing a plurality of selected at least one feed of online content items unilaterally from the sharer to the sharee, displaying a link that includes an ID of the real feed and a share mode, and wherein the creation of a shared entity in the sharee's account does not necessarily follow normal group authorization.

Figure 5:
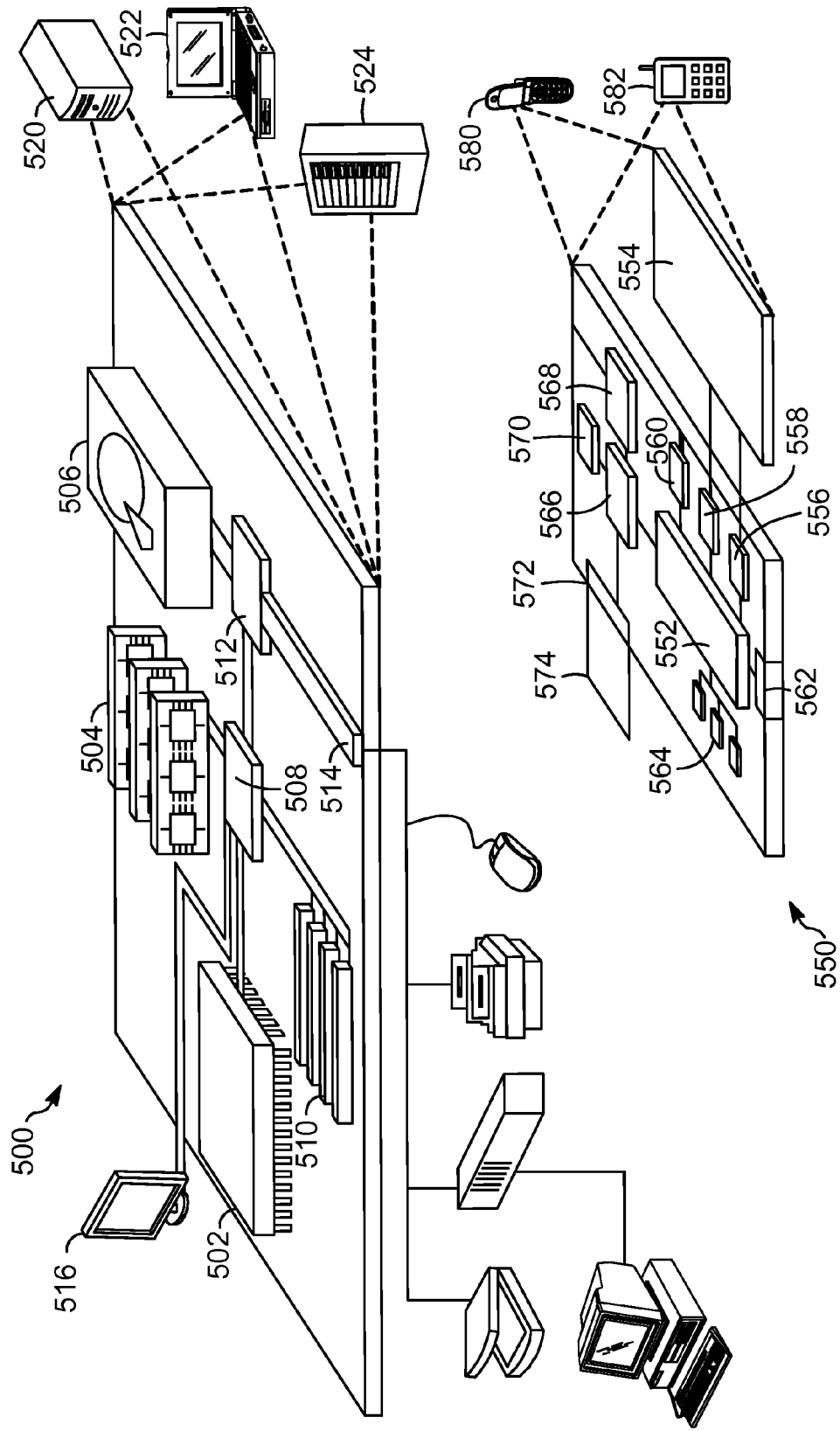

FIG. 5 is a diagram of example computing devices 500 and 550 that may be used in environment 100 shown in FIG. 1. More specifically, FIG. 5 shows an example of a generic computing device 500 and a generic mobile computing device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be examples only, and are not meant to limit implementations of the disclosure described and/or claimed in this document.

Computing device 500 includes a processor 502, a memory 504, a storage device 506, a high-speed interface/controller 508 connecting to memory 504 and high-speed expansion ports 510, and a low speed interface/controller 512 connecting to a low speed bus 514 and storage device 506. Each of components 502, 504, 506, 508, 510, and 512, are interconnected using various busses, and may be mounted on a common motherboard or in other manners as appropriate. processor 502 can process instructions for execution within computing device 500, including instructions stored in memory 504 or on storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

Memory 504 stores information within computing device 500. In one implementation, memory 504 is a volatile memory unit or units. In another implementation, memory 504 is a non-volatile memory unit or units. Memory 504 may also be another form of computer-readable medium, such as a magnetic or optical disk.

Storage device 506 is capable of providing mass storage for computing device 500. In one implementation, storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as memory 504, storage device 506, or memory on processor 502.

High speed controller 508 manages bandwidth-intensive operations for computing device 500, while low speed controller 512 manages lower bandwidth-intensive operations. Such allocation of functions is example only. In one implementation, high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed buss 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. Computing device 550 may also be provided with a storage device, such as a microdrive or other device, to provide additional storage. Each of components 550, 552, 564, 554, 566, and 568, are interconnected using various buses, and several of the components may be mounted on a common motherboard or in other manners as appropriate.

Processor 552 can execute instructions within computing device 550, including instructions stored in memory 564. Processor 552 may be implemented as a chipset of chips that include separate and multiple analog and digital processors. Processor 552 may provide, for example, for coordination of the other components of computing device 550, such as control of user interfaces, applications run by computing device 550, and wireless communication by computing device 550.

Processor 552 may communicate with a user through control interface 558 and display interface 556 coupled to a display 554. Display 554 may be, for example, a TFT LCD (Thin-Film-Transistor Liquid Crystal Display) or an OLED (Organic Light Emitting Diode) display, or other appropriate display technology. Display interface 556 may comprise appropriate circuitry for driving display 554 to present graphical and other information to a user. Control interface 558 may receive commands from a user and convert them for submission to processor 552. In addition, an external interface 562 may be provide in communication with processor 552, so as to enable near area communication of computing device 550 with other devices. External interface 562 may provide, for example, for wired communication in some implementations, or for wireless communication in other implementations, and multiple interfaces may also be used.

Memory 564 stores information within computing device 550. Memory 564 can be implemented as one or more of a computer-readable medium or media, a volatile memory unit or units, or a non-volatile memory unit or units. Expansion memory 574 may also be provided and connected to computing device 550 through expansion interface 572, which may include, for example, a SIMM (Single In-line Memory Module) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provide as a security module for computing device 550, and may be programmed with instructions that permit secure use of computing device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as memory 564, expansion memory 574, or memory on processor 552 that may be received, for example, over transceiver 568 or external interface 562.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning system) receiver module 570 may provide additional navigation- and location-related wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.) and may also include sound generated by applications operating on computing device 550.

Computing device 550 may be implemented in a number of different forms, as shown in the figure. For example, it may be implemented as a cellular telephone 580. It may also be implemented as part of a smart phone 582, personal digital assistant, a computer tablet, or other similar mobile device.

Figure 6:
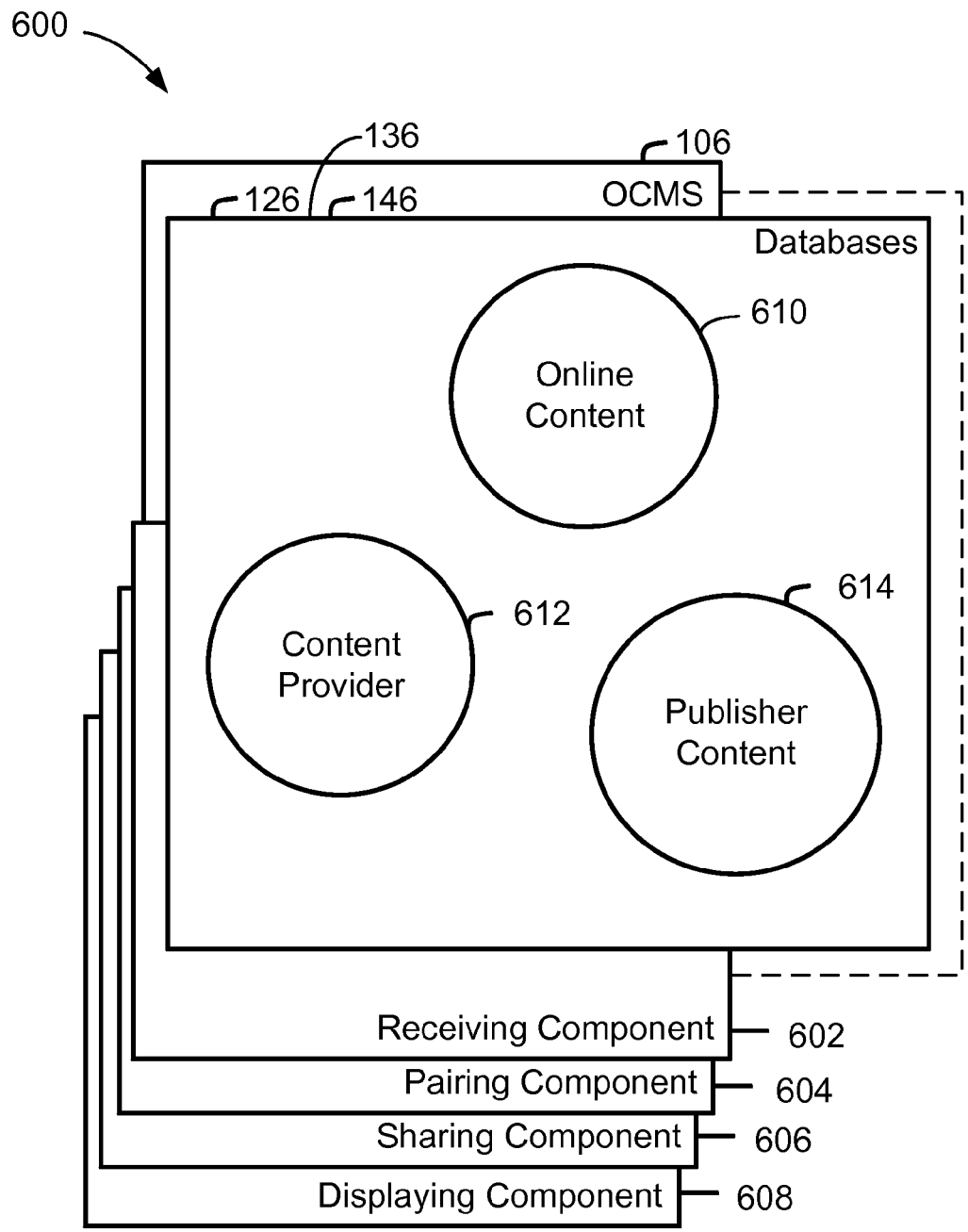

FIG. 6 is a diagram 600 of components of one or more example computing devices, for example computing device 500 (shown in FIG. 5) that may be used in environment 100 (shown in FIG. 1).

One or more of computing devices 500 may form at least a portion of OCMS 106 or user access devices 108 (shown in FIG. 1). FIG. 6 further shows a configuration of databases 126, 136, and 146 (both shown in FIG. 1). Databases 126 and 146 are coupled to several separate components within OCMS 106, content provider data processing system 112, and user access devices 108 (shown in FIG. 1), which perform specific tasks.

OCMS 106 includes a receiving component 602 for receiving, from a sharer, a selection of at least one feed of online content to be shared and at least one sharee of the feed of online content. OCMS 106 also includes a pairing component 604 for pairing the sharer with at least one sharee of the feed of online content by securely linking a representation of the sharer in an account of the sharee to a representation of the sharee in an account of the sharer and linking a representation of the sharee in an account of the sharer to a representation of the sharer in an account of the sharee. OCMS 106 also includes a sharing component 606 for sharing the selected at least one feed of online content from the sharer to the sharee. OCMS 106 also includes a displaying component 608 for displaying a link to the shared feed as a normal feed object under the sharee's account.

In the exemplary embodiment, databases 126, 136, and 146 are divided into a plurality of sections, including but not limited to, an online content section 610, a content provider section 612, and a publisher content data section 614. These sections within database 126, 136, and 146 are interconnected to update and retrieve the information as required. Online content section 610 may include information including, for example, online content, online content layout options, online content layouts, and online content extension modules. Content provider section 612 may include information including, for example, geographic regions of interest of content provider 102. Publisher content data section 614 may include information including, for example, content that is relevant to publisher sites, publications and publisher audiences based on the crawled publications.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing systems 500 and 552 are configured to receive and/or retrieve data pertaining to the creation, review and revision of online content; data regarding online content providers 102, online content links or impressions corresponding to those online content providers 102 that appear on a web page, and metrics corresponding to the appearance of those impressions on that web page, etc., from various other computing devices connected to computing devices 500 and 552 through a communication network, and store this data within at least one of memory 504, storage device 506, and memory 564. Computing systems 500 and 552 are further configured to manage and organize the data within at least one of memory 504, storage device 506, and memory 564 using the techniques described herein.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

The invention claimed is:

1. A computer-implemented method for sharing online content, the method implemented using a computer device coupled to a user interface and a memory device, the method comprising:

receiving, by a server of an online content management system (OCMS) from a sharer, a selection of a feed of online content to be shared and a sharee of the feed of online content, the feed of online content including a plurality of dynamic content items, each dynamic content item including a reference identifier linking each dynamic content item to respective historical interaction data indicative of respective click-throughs or conversions, each dynamic content item generated according to an online content item template using one or more components;

generating a link to the feed of online content including an identifier of the feed of online content and an indication of a sharing mode identifying a level of access control that governs access to the feed of online content;

pairing, by the server, the sharer with at least one sharer of the feed of online content by securely linking a representation of the sharer in an account of the sharer to a representation of the sharer in an account of the sharer and linking a representation of the sharee in an account of the sharer to a representation of the sharee in an account of the sharee;

transmitting, by the server, the link to the feed of online content to the sharee; and displaying the link to the feed of online content as a normal feed object under the sharee's account.

2. The method of claim 1, further comprising initiating sharing of an account associated with the sharer in a feed sharing tool with the sharee associated with the sharer in a different account in the tool.

3. The method of claim 1, wherein the historical interaction data further includes at least one of an identification of other associated items, views of each dynamic content item by users, and categories of demographics associated with each dynamic content item.

4. The method of claim 1, wherein the plurality of dynamic content items are components of an online content item.

5. The method of claim 1, wherein said receiving comprises receiving, from a sharer a selection of at least one dynamic creative to be shared and at least one sharee of the dynamic creative.

6. The method of claim 1, wherein said receiving comprises receiving, from a sharer a selection of a plurality of dynamic creatives associated with a single webpage.

7. The method of claim 1, wherein said pairing comprises transmitting a secure ID from the sharer to the sharee.

8. The method of claim 7, wherein said transmitting a secure ID from the sharer to the sharee comprises transmitting a hash ID from the sharer to the sharee.

9. The method of claim 7, wherein said transmitting a secure ID from the sharer to the sharee comprises including the secure ID in an electronic communication between the sharer and the sharee.

10. The method of claim 1, wherein sharing the feed of online content from the sharer to the sharee comprises sharing the feed of online content unilaterally from the sharer to the sharee.

11. The method of claim 1, wherein sharing the feed of online content from the sharer to the sharee comprises sharing a plurality of feeds of online content unilaterally from the sharer to the sharee.

12. The method of claim 1, wherein creation of a shared entity in the sharee's account does not follow normal group authorization.

13. The method of claim 1, further comprising repeating the steps of claim 1 to share additional feeds.

14. A computer system comprising:

a processor; and a computer-readable storage device having encoded thereon computer readable instructions that are executable by the processor to perform functions comprising:

receiving, from a sharer, a selection of a feed of online content to be shared and a sharee of the feed of online content, the feed of online content including a plurality of dynamic content items, each dynamic content item including a reference identifier linking each dynamic content item to respective historical interaction data indicative of respective click-throughs or conversions, each dynamic content item generated according to an online content item template using one or more components;

generating a link to the feed of online content including an identifier of the feed of online content and an indication of a sharing mode identifying a level of access control that governs access to the feed of online content;

pairing the sharer with the sharee of the feed of online content by securely linking a representation of the sharer in an account of the sharee to a representation of the sharer in an account of the sharer and linking a representation of the sharee in an account of the sharer to a representation of the sharee in an account of the sharee;

transmitting the link to the feed of online content to the sharee; and displaying the link to the feed of online content as a normal feed object under the sharee's account.

15. The system of claim 14, further comprising presenting, in a user interface, a representation of the feed of online content.

16. The system of claim 14, further comprising:
transmitting a secure ID from the sharer to the sharee in an electronic communication between the sharer and the sharee.

17. One or more non-transitory computer-readable storage media having computer-executable instructions embodied thereon, wherein when executed by at least one processor, the computer-executable instructions cause the processor to:

receive, from a sharer, a selection of a feed of online content associated with a single webpage to be shared and a sharee of the feed of online content, the feed of online content including a plurality of dynamic content items, each dynamic content item including a reference identifier linking each item to respective historical interaction data indicative of respective click-throughs or conversions, each dynamic content item generated according to an online content item template using one or more components;

generate a link to the feed of online content including an identifier of the feed of online content and an indication of a sharing mode identifying a level of access control that governs access to the feed of online content;

pair the sharer with the sharee of the feed of online content by securely linking an account of the sharer to an account of the sharee;

transmit the link to the feed of online content the sharee; and display the link to the feed of online content as a normal feed object under the sharee's account.

18. The computer-readable storage media of claim 17, wherein the computer-executable instructions further cause the processor to:

transmit a secure ID from the sharer to the sharee in an electronic communication between the sharer and the sharee.

* * * * *